(12) United States Patent
Arita et al.

(10) Patent No.: US 9,225,207 B2
(45) Date of Patent: Dec. 29, 2015

(54) ROTATING ELECTRIC MOTOR AND INTERNAL COMBUSTION ENGINE SUPERCHARGER

(75) Inventors: Hideaki Arita, Tokyo (JP); Takashi Goto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/400,260

(22) PCT Filed: Aug. 24, 2012

(86) PCT No.: PCT/JP2012/071421
§ 371 (c)(1),
(2), (4) Date: Nov. 10, 2014

(87) PCT Pub. No.: WO2014/030251
PCT Pub. Date: Feb. 27, 2014

(65) Prior Publication Data
US 2015/0122235 A1  May 7, 2015

(51) Int. Cl.
*F04B 35/04* (2006.01)
*H02K 1/17* (2006.01)
*H02K 21/44* (2006.01)
*H02K 1/14* (2006.01)
*F02B 33/40* (2006.01)
*F04D 25/06* (2006.01)
*H02K 1/08* (2006.01)
*H02K 7/14* (2006.01)
*H02K 11/00* (2006.01)

(52) U.S. Cl.
CPC *H02K 1/17* (2013.01); *F02B 33/40* (2013.01); *F04D 25/06* (2013.01); *H02K 1/08* (2013.01); *H02K 1/146* (2013.01); *H02K 21/44* (2013.01); *H02K 7/14* (2013.01); *H02K 11/0073* (2013.01); *H02K 2213/03* (2013.01)

(58) Field of Classification Search
CPC ... H02K 41/035; H02K 41/0352; H02K 1/17; H02K 1/12; H02K 1/14; H02K 1/145; H02K 1/146; H02K 2201/00
USPC .......... 60/608; 310/178, 154.37, 156.64, 310/156.55, 154.11, 154.08, 154.21, 310/154.22, 154.25
See application file for complete search history.

(56) References Cited

U.S. PATENT DOCUMENTS

| 5,504,382 A | * | 4/1996 | Douglass | H02K 1/278 310/114 |
| 2011/0058967 A1 | * | 3/2011 | Arita | H02K 1/145 417/410.1 |
| 2011/0070108 A1 | | 3/2011 | Arita et al. | |

FOREIGN PATENT DOCUMENTS

| JP | 08-214519 A | 8/1996 |
| WO | WO 2009/136574 A1 | 11/2009 |
| WO | WO 2009/139278 A1 | 11/2009 |

* cited by examiner

*Primary Examiner* — Jesse Bogue
*Assistant Examiner* — Vikansha Dwivedi
(74) *Attorney, Agent, or Firm* — Birch, Stewart, Kolasch & Birch, LLP (57) ABSTRACT

Teeth-shaped portions 11b of a magnet 11 are formed in such a way that a part of the plane of projection of each of the teeth-shaped portions protrudes in a circumferential direction with respect to that of one of teeth 8b and 9b which is viewed from an axial direction of a first stator core 8 and a second stator core 9.

5 Claims, 8 Drawing Sheets

ROTATING ELECTRIC MOTOR AND INTERNAL COMBUSTION ENGINE SUPERCHARGER

FIELD OF THE INVENTION

The present invention relates to a rotating electric motor in which a rotor consists of a magnetic body and a magnet (permanent magnet) is disposed as a stator, and an internal combustion engine supercharger for cars etc. which uses the rotating electric motor.

BACKGROUND OF THE INVENTION

It is well known that a conventional switched reluctance motor structure is advantageous particularly as a high-speed rotation electric motor because the switched reluctance motor structure has high mechanical durability and can be expected to provide a high degree of efficiency. For example, a conventional switched reluctance motor structure is disclosed by patent reference 1 etc. A permanent magnet motor disclosed by this patent reference 1 has a structure of including: a rotor in which each of two laminated magnetic bodies is divided into an N pole and an S pole with the magnetic bodies being arranged at a predetermined interval, and salient poles which are the N pole and the S pole are mounted to a rotating shaft with each of the salient poles being twisted by one-half the pitch; and a stator in which a magnetic body is divided into two parts in an axial direction two in such a way as to enclose the N pole and the S pole of the above-mentioned rotor, and a magnet for field magnetomotive force generation which is magnetized in the axial direction is placed between the magnetic bodies. Because such a conventional permanent magnet motor has a structure of making the salient poles of the rotor serve as magnetic poles by using the magnet disposed in the stator, it is not necessary to dispose a magnet in the rotor. Therefore, because the structure has high mechanical durability, it is suitable for a rotating electric motor ready for high-speed rotation or ultra-high-speed rotation. In patent reference 1, it is also illustrated that the stator core and the magnet have substantially the same shape.

RELATED ART DOCUMENT

Patent Reference

Patent reference 1: Japanese Unexamined Patent Application Publication No. 8-214519

SUMMARY OF THE INVENTION

Problems to be Solved by the Invention

Conventional high-speed rotation motors are of permanent magnet motor type, as disclosed by above-mentioned patent reference 1, and, typically, the stator core and the magnet are set to have substantially the same shape. A problem is, however, that in the case of a high-power electric motor which requires a large current, because an excessive magnetic leakage flux occurs between teeth adjacent to each other in the stator core when the stator core and the magnet have the same shape, the motor efficiency deteriorates, and, as a consequence of this deterioration, the time required to reach a necessary number of rotations, i.e., the speed of response gets worse to the highest degree.

For example, a supercharger for cars that rotates a rotary wing connected to a rotating shaft of a motor at a high speed and provides a pressurized supply of suction air for an internal combustion engine in response to a supply of a large current, and so on has a large problem of how to improve the speed of response. However, as long as the stator core and the magnet are set to have substantially the same shape, a deterioration in the speed of response under the influence of a magnetic leakage flux between teeth is not avoided. Therefore, particularly when using a permanent magnet motor method in an internal combustion engine supercharger, a measure for reducing the magnetic leakage flux between teeth is an important issue.

The present invention is made in order to solve the above-mentioned problems, and it is therefore an object of the present invention to provide a rotating electric motor that is fit for uses that require a supply of a large current and that are requested of ultra-high-speed rotations whose number reaches 100,000 rotations, and an internal combustion engine supercharger using the rotating electric motor.

Means for Solving the Problem

A rotating electric motor in accordance with the present invention includes: a frame; a rotor that is fixed to a rotating shaft rotatably supported by the frame, and that is rotatably disposed within the frame; and a stator including two stator cores of the same shape that are held by the frame and that are coaxially disposed in such a way as to enclose the rotor, a magnet for field magnetomotive force generation that is sandwiched between the above-mentioned two stator cores and that excites the rotor, and a drive coil for torque generation that is wound around the above-mentioned two stator cores and that causes the rotor to generate a rotary torque, and each of the stator cores has a disk-shaped core back and teeth protruding inwardly in a radial direction from an inner surface of the above-mentioned core back and constructing slots that are open toward an inner circumference thereof, the magnet for field magnetomotive force generation has a core-back-shaped portion of the same shape as the core backs of the stator cores and teeth-shaped portions of the same shape as the teeth, and a part of a plane of projection of each of the teeth-shaped portions of the magnet for field magnetomotive force generation protrudes in a circumferential direction with respect to that of one of the teeth which is viewed from an axial direction of the stator cores.

An internal combustion engine supercharger in accordance with the present invention rotationally drives a rotary wing of a compressor by using the above-mentioned rotating electric motor.

Advantages of the Invention

In accordance with the present invention, a part of the plane of projection of each of the teeth-shaped portions of the magnet for field magnetomotive force generation protrudes in a circumferential direction with respect to that of one of the teeth which is viewed from an axial direction of the stator cores. Therefore, in a case in which the width in the circumferential direction of each of the teeth is narrowed so as to make the magnet for field magnetomotive force generation protrude, because a magnetic leakage flux occurring by way of the core backs of the stator enclosing the drive coil for torque generation, teeth adjacent to each other in the circumferential direction, and the slots can be reduced greatly, a reduction of the driving torque due to the occurrence of the magnetic leakage flux can be prevented. In contrast, in a case in which the width in the circumferential direction of each of the teeth-shaped portions of the magnet for field magnetomotive force generation is widened so as to make the magnet protrude with respect to the teeth, the driving torque can be increased because the flux densities of the teeth are increased. Therefore, in both the cases, a rotating electric motor which is suitable for uses which require ultra-high-speed rotations can be provided.

In accordance with the present invention, because the supercharge capability of the supercharger can be increased and the responsivity of the supercharge function can also be improved greatly by using the rotating electric motor which is suitable for ultra-high-speed rotations, an internal combustion engine supercharger having high responsivity according to the driver's acceleration operation can be provided.

EMBODIMENTS OF THE INVENTION

Hereafter, in order to explain this invention in greater detail, the preferred embodiments of the present invention will be described with reference to the accompanying drawings.

Embodiment 1

Figure 1:
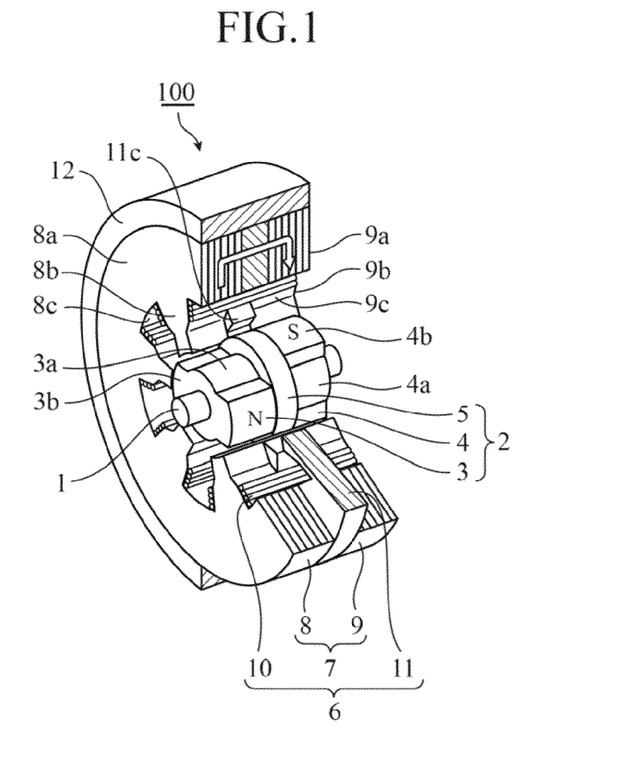
FIG. 1 is a partially broken perspective view showing the structure of a rotating electric motor in accordance with Embodiment 1 of the present invention.

As shown in FIG. 1, a rotating electric motor 100 includes a rotor 2 coaxially fixed to a rotating shaft 1, a stator 6 that is coaxially disposed in such a way as to enclose the rotor 2, and in which a stator coil 10, provided as a drive coil for torque generation, is wound around a stator core 7 sandwiching a magnet 11 for field magnetomotive force generation, and a frame 12 that is made from, for example, a metal, such as an iron material or an aluminum material, and that accommodates and holds the rotor 2 and the stator 6 in a cylindrical portion thereof. The frame 12 has the cylindrical portion shown in FIG. 1, and a not-shown pair of end plates that close openings at both ends of this cylindrical portion.

The rotor 2 includes a first magnetic body 3 and a second magnetic body 4 each of which is produced by laminating a large number of magnetic steel plates, which are formed in a specific shape, for example, into a single piece, and a disk-shaped partition 5 which is produced by laminating a predetermined number of magnetic steel plates into a single piece and in which an insertion hole into which the rotating shaft 1 is inserted is drilled at an axial center position thereof. The first magnetic body 3 and the second magnetic body 4 are produced in such a way as to have the same shape, and are comprised of cylindrical bases 3a and 4a in which an insertion hole into which the rotating shaft 1 is inserted is drilled at axial center positions thereof, and salient poles 3b and 4b, two salient poles for each magnetic body, which are disposed in such a way as to protrude outwardly in a radial direction from the outer surfaces of the bases 3a and 4a, and to be arranged at equal angular pitches in a circumferential direction, respectively. The first magnetic body 3 and the second magnetic body 4 are arranged in such a way as to be circumferentially displaced by one-half the salient pole pitch with respect to each other, and to face and be in close contact with each other via the partition 5, and are constructed in such a way as to be fixed to the rotating shaft 1 inserted in the insertion holes thereof.

Each of the first and second magnetic bodies 3 and 4 is formed of a large number of magnetic steel plates which are laminated into a single piece. As an alternative, each of the first and second magnetic bodies can be formed by hardening an iron powder, such as a powder-compacted iron core, with a resin. In this case, the same advantage as that provided in the case of laminating magnetic steel plates into a single piece can be provided.

The stator core 7 is provided with a first stator core 8 and a second stator core 9 each of which is produced by laminating a plurality of magnetic steel plates, which are formed in a specific shape, into a single piece. The first stator core 8 is provided with a cylindrical core back 8a and six teeth 8b that are disposed in such a way as to protrude inwardly in a radial direction from an inner surface of the core back 8a, and to be arranged at equal angular pitches in a circumferential direction, and a slot 8c that is open toward an inner circumference of the stator core is formed between any two teeth 8b adjacent to each other in the circumferential direction.

The stator core 7 is formed of a number of magnetic steel plates which are laminated into a single piece. As an alternative, the stator core can be formed by hardening an iron powder, such as a powder-compacted iron core, with a resin. In this case, the same advantage as that provided in the case of laminating magnetic steel plates into a single piece can be provided.

The second stator core 9 is produced in such a way as to have the same shape as the first stator core 8, and is provided with a cylindrical core back 9a and six teeth 9b that are disposed in such a way as to protrude inwardly in a radial direction from an inner surface of the core back 9a, and to be arranged at equal angular pitches in a circumferential direction, and a slot 9c that is open toward an inner circumference of the stator core is formed between any two teeth 9b adjacent to each other in the circumferential direction.

The first stator core 8 and the second stator core 9 which are constructed this way are arranged in such a way that the positions in the circumferential direction of the teeth 8b match those of the teeth 9b, the first and second stator cores are coaxially arranged while being apart from each other by a gap corresponding to the thickness in the axial direction of the partition 5, and the first stator core 8 encloses the first magnetic body 3 and the second stator core 9 encloses the second magnetic body 4.

The stator coil 10 consists of six-phase coils wound around the teeth 8b and 9b which are opposite to each other with respect to the axial direction and pair up with each other, i.e., wound around the teeth according to a so-called concentrated winding method. The stator coil 10 is constructed actually by repeatedly winding windings for three phases U, V, and W N times in turn around the six pairs of teeth 8b and 9b, which are opposite to each other with respect to the axial direction and pair up with each other, in a concentrated winding manner.

The magnet 11 is formed in such a way as to have substantially the same shape as the first stator core 8 and the second stator core 9, and is coaxially sandwiched by these first and second stator cores 8 and 9. The magnet 11 is formed in a shape in which the magnet partially protrudes with respect to the teeth 8b and 9b. The details of the shapes of the first stator core 8, the second stator core 9, and the magnet 11 will be mentioned below.

The rotating shaft 1 is rotatably supported by the not-shown pair of end plates of the frame 12, the rotor 2 is accommodated in the cylindrical portion of the frame 12 in a state in which the rotor can rotate freely, and the stator 6 is press-fitted into the cylindrical portion of the frame 12 and is held in a state in which the stator is coaxially placed in such a way as to enclose this rotor 2, so that the rotating electric motor 100 is constructed.

In the rotating electric motor 100 constructed this way, a magnetic flux flowing from the salient pole 3b of the first magnetic body 3 into the first stator core 8 and returning from the second stator core 9 to the salient pole 4b of the second magnetic body 4 is formed because of the magnetic force of the magnet 11, as shown by an arrow in FIG. 1. At this time, because the salient poles 3b and 4b of the first magnetic body 3 and the second magnetic body 4 are circumferentially displaced by one-half the salient pole pitch with respect to each other, the magnetic flux acts in such a way that an N pole and an S pole are arranged alternately in the circumferential direction when viewed from the axial direction. As a result, the rotating electric motor 100 operates as a non-commutator motor, and magnetically operates like a 4-pole 6-slot permanent magnet rotating electric motor in which a concentrated winding method is adopted.

Next, the details of the shapes of the first stator core 8, the second stator core 9, and the magnet 11 will be explained.

Figure 2:
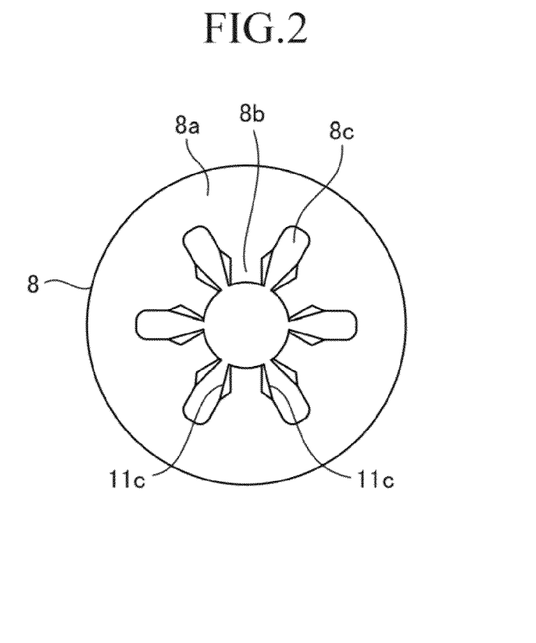
FIG. 2 is a plane view which is viewed from a first stator core in a state in which a stator core and a magnet of the rotating electric motor in accordance with Embodiment 1 are placed on top of each other with respect to an axial direction.
Figure 3:
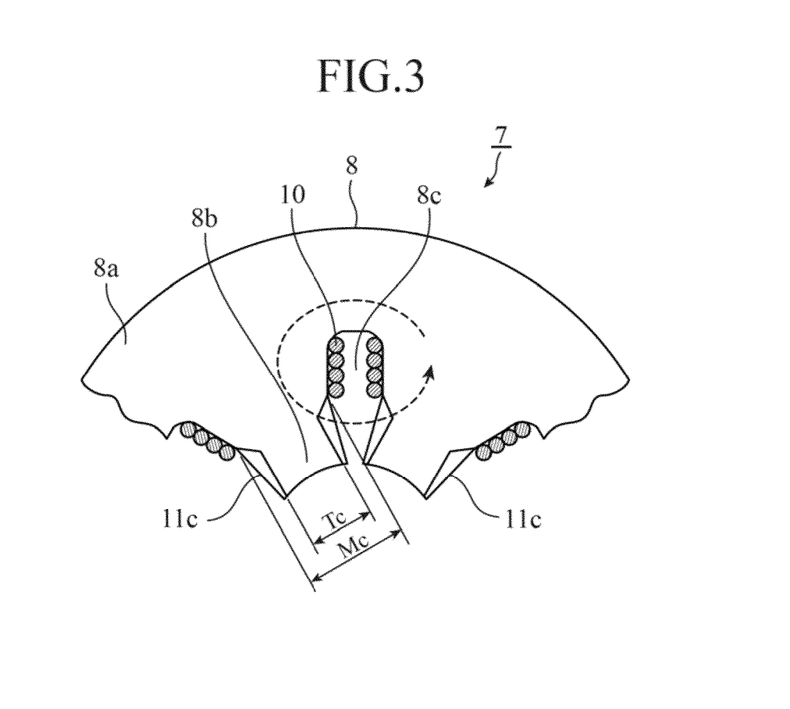
FIG. 3 is an enlarged view of a stator of the rotating electric motor in accordance with Embodiment 1 which is viewed from the first stator core.
Figure 4:
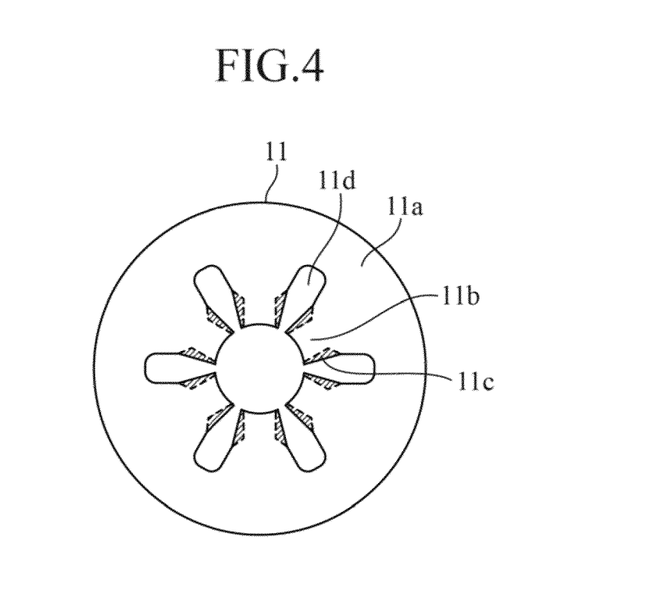
FIG. 4 is a plane view showing the shape of a magnet of the rotating electric motor in accordance with Embodiment 1.

FIG. 2 is a plane view which is viewed from the first stator core 8 in a state which the stator core 7 and the magnet 11 of the rotating electric motor 100 in accordance with Embodiment 1 are placed on top of each other with respect to the axial direction, and FIG. 3 is an enlarged view of a part of FIG. 2. FIG. 4 is a plane view showing the shape of the magnet 11.

The magnet 11 has a core-back-shaped portion 11a having substantially the same shape as the core backs 8a and 9a of the first stator core 8 and the second stator core 9 and sandwiched between the core backs 8a and 9a, and teeth-shaped portions 11b each having substantially the same shape as the teeth 8b and 9b and sandwiched between teeth 8b and 9b. Further, between teeth-shaped portions 11b, a slot-shaped portion 11d having substantially the same shape as the slots 8c and 9c is open, and the stator coil 10 penetrates each slot-shaped portion 11d. The size (width) in the circumferential direction of each of the teeth-shaped portions 11b is set to be larger than the size (width) in the circumferential direction of each of the teeth 8b and 9b, parts of each teeth-shaped portion protruding with respect to the teeth 8b and 9b are defined as protruding portions 11c. In FIG. 4, each protruding portion 11c is shown by a hatched area.

Therefore, in FIG. 2, when the stator core 7 in the state in which the magnet 11 is sandwiched between the first stator core 8 and the second stator core 9 which is hidden from sight is viewed from the axial direction, each protruding portion 11c of the magnet 11 protrudes toward the circumferential direction of the teeth 8b. Tc in FIG. 2 shows the size in the circumferential direction of each of the teeth 8b and 9b of the first stator core 8 and the second stator core 9 which is hidden from sight, and Mc shows the size in the circumferential direction of each teeth-shaped portion 11b including protruding portions 11c of the magnet 11. The following relationship: Mc>Tc is established.

Hereafter, the effect of the protrusion of the magnet 11 with respect to the teeth 8b and 9b of the stator core 7 will be explained.

Figure 5:
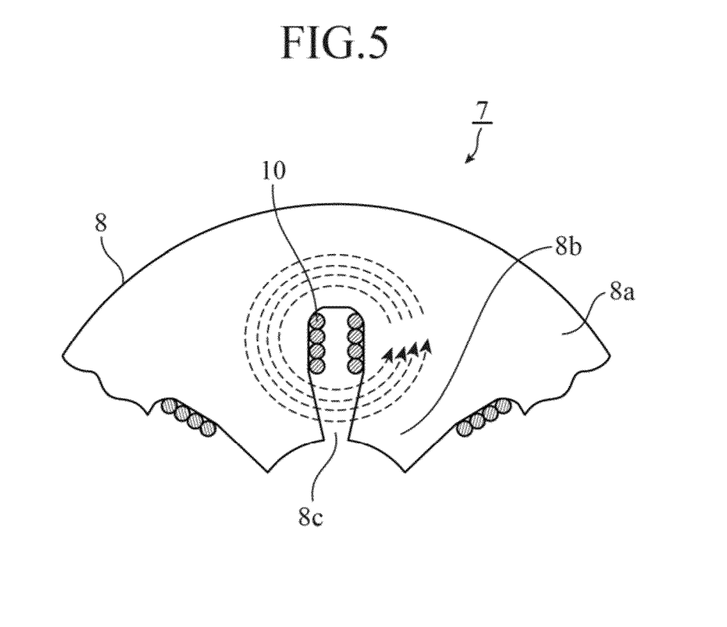
FIG. 5 is an enlarged view of a stator, which is viewed from a first stator core, having a conventional shape in which no protruding portion of the magnet exists.

FIG. 5 schematically shows a situation in which a magnetic leakage flux occurs between teeth 8b in the case in which the magnet has a shape in which there is a relationship of Mc=Tc showing that no protruding portion 11c exists in the magnet 11, i.e., a conventional shape. In FIG. 5, because the magnet 11 and the second stator core 9 are formed in such a way as to have the same shape as the first stator core 8, the magnet 11 and the second stator core 9 are hidden from sight behind the first stator core 8 in a state in which the cores and the magnet are placed on top of one another. Further, while the size in the circumferential direction of each teeth-shaped portion 11b of the magnet 11 is identical for the cases of FIGS. 2 and 5, in the case of FIG. 2, the size in the circumferential direction of the leading end part of each of the teeth 8b and 9b is made to be smaller than that in the case of FIG. 5 (the slots 8c and 9c are widen) to form the protruding portions 11c.

When a current is fed through the stator coil 10 in each of the structures of FIGS. 2 and 5, a magnetic flux leaks into the atmospheric air in each of the slots 8c and 9c via the core backs 8a and 9a, which enclose the stator coil 10, and the teeth 8b and 9b. As a result, a magnetic path centered at the stator coil 10 and shown by a broken line in the figure is formed, and a leak of a magnetic flux occurs.

In a case in which the rotating electric motor needs to feed a large current, like an internal combustion engine supercharger for cars, a deterioration of efficiency due to the magnetic leakage flux occurring between teeth 8b adjacent to each other in the circumferential direction and between teeth 9b adjacent to each other in the circumferential direction leads to a reduction of the driving torque of the supercharger. For example, in a case in which the rotating electric motor is an ultra-high-speed one whose number of rotations reaches 100,000, the speed of response decreases greatly.

Figure 6:
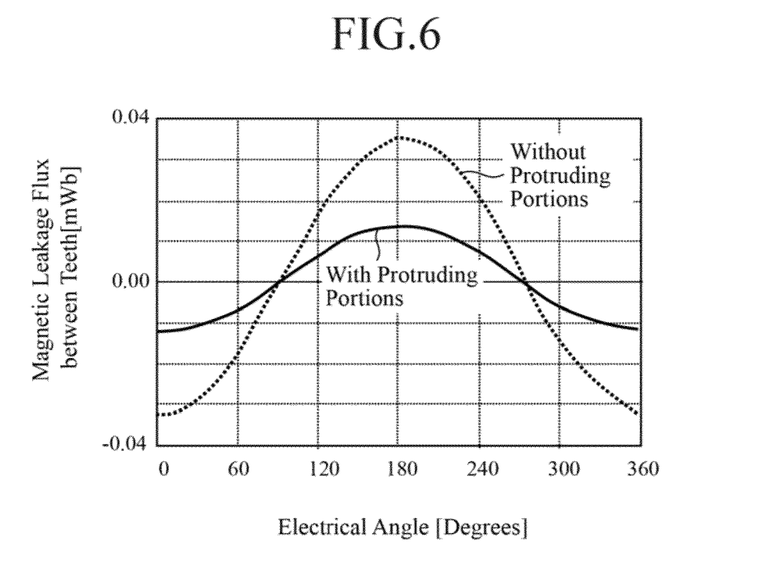
FIG. 6 is a magnetic leakage flux comparison graph for explaining a comparison between the characteristic of a magnetic leakage flux occurring between teeth of the stator in the rotating electric motor in accordance with Embodiment 1, and the characteristic of a magnetic leakage flux occurring between teeth of the stator having the conventional shape.

FIG. 6 is a graph showing trial calculation results of the amount of magnetic leakage flux between teeth both in the shape in accordance with this Embodiment 1 shown in FIG. 2 (with the protruding portions 11c), and in the conventional shape shown in FIG. 5 (without the protruding portions 11c). In the figure, the horizontal axis shows the electrical angle [degrees] and the vertical axis shows the amount of magnetic leakage flux between teeth [mWb]. Further, the characteristic of the magnetic leakage flux in the case of the conventional shape (without the protruding portions 11c) is shown by a dotted line and the characteristic of the magnetic leakage flux in the case of the shape in accordance with this Embodiment 1 (with the protruding portions 11c) is shown by a solid line.

In this example of the trial calculation, the absolute value of the magnetic leakage flux has a maximum every 180 degrees of electrical angle, and it is seen from a comparison in this maximum between the magnetic leakage flux in the case of the conventional shape (without the protruding portions 11c) and that in the case of the shape in accordance with this Embodiment 1 (with the protruding portions 11c) that the magnetic leakage flux in the case of the shape in accordance with this Embodiment 1 (with the protruding portions 11c) is reduced by about 60% as compared with that in the case of the conventional shape (without the protruding portions 11c).

Therefore, it is seen that by setting the size in the circumferential direction of each of the teeth 8b and 9b of the first stator core 8 and the second stator core 9 to be smaller, disposing protruding portions 11c in each teeth-shaped portion 11b of the magnet 11, and making the protruding portions have a shape in which the relationship of Mc>Tc is established, the magnetic leakage flux can be reduced greatly as compared with a rotating electric motor having the conventional shape, i.e., a shape having the relationship of Mc=Tc.

Therefore, the inventors etc. manufactured an experimental model for motor performance evaluation having the stator core 7 having a conventional shape (without the protruding portions 11c) and another one having the shape in accordance with this Embodiment 1 (with the protruding portions 11c), and recognized an improvement effect of the performance of the rotating electric motor which is caused by the reduction of the magnetic leakage flux.

Figure 7:
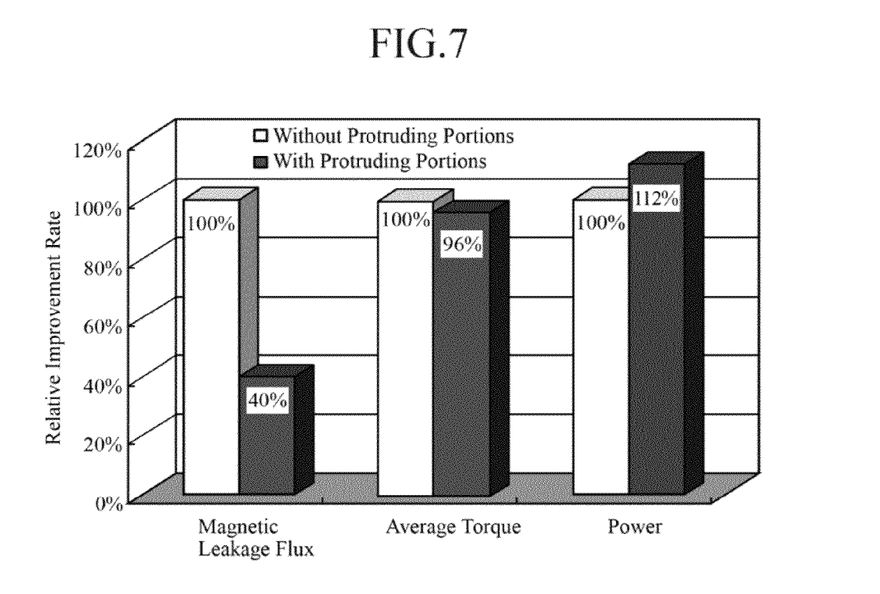
FIG. 7 is a graph showing a performance improvement effect of the rotating electric motor in accordance with Embodiment 1 which is relative to that of a rotating electric motor having the conventional shape.

FIG. 7 is a bar graph showing relative test results for the recognition of the improvement effect of the performance of the rotating electric motor, and white bars show the test results of the rotating electric motor including the stator core having the conventional shape (without the protruding portions 11c) and black bars show the test results of the rotating electric motor 100 including the stator core 7 having the shape in accordance with this Embodiment 1 (with the protruding portions 11c).

It has been previously explained with reference to FIG. 6 that the magnetic leakage flux between teeth can be improved (reduced) by about 60% by using the stator core 7 having the shape in accordance with this Embodiment 1 (with the protruding portions 11c), as compared with the case of using the stator core 7 having the conventional shape (without the protruding portions 11c). At that time, in accordance with this Embodiment 1, by making the size in the circumferential direction of the leading end part of each of the teeth 8b and 9b be smaller, the area of the tip of each of the teeth 8b and 9b, the leading tip facing the rotor 2, is set to be slightly small, and, as a result, an average torque decreases by 4%. However, this reduction of the average torque is small, and the speed of response of the rotating electric motor 100 is substantially the same as that of the rotating electric motor using the stator core having the conventional shape (without the protruding portions 11c).

As to an increase in the power of the rotating electric motor 100 which is the object that should be achieved by the present invention, about 12% of increase in the power is obtained as compared with the rotating electric motor having the conventional shape, as shown in FIG. 7. Therefore, it is clear that the effect of reducing the magnetic leakage flux between teeth which is provided by the stator core 7 having the shape in accordance with this Embodiment 1 (with the protruding portions 11c) greatly contributes to the increase in the power of the rotating electric motor 100.

As mentioned above, the rotating electric motor 100 in accordance with Embodiment 1 includes: the frame 12; the rotor 2 that is fixed to the rotating shaft 1 rotatably supported by the frame 12 and that is rotatably disposed within the frame 12; and the stator 6 having the first stator core 8 and the second stator core 9 of the same shape that are held by the frame 12 and that are coaxially disposed in such a way as to enclose the rotating shaft 1, the magnet 11 that is sandwiched between the first stator core 8 and the second stator core 9 and that excites the rotor 2, and the stator coil 10 that is wound around the first stator core 8 and the second stator core 9 and that causes the rotating shaft 1 to generate a rotary torque, and each of the first stator core 8 and the second stator core 9 is produced by laminating magnetic steel plates, the first stator core 8 and the second stator core 9 have disk-shaped core backs 8a and 9a and teeth 8b and 9b protruding inwardly in a radial direction from inner surfaces of the core backs 8a and 9a and constructing slots 8c and 9c that are open toward inner circumferences thereof, the magnet 11 has a core-back-shaped portion 11a of the same shape as the core backs 8a and 9a of the first stator core 8 and the second stator core 9 and teeth-shaped portions 11b of substantially the same shape as the teeth 8b and 9c, and a part of the plane of projection of each of the teeth-shaped portions 11b of the magnet 11 protrudes in a circumferential direction with respect to that of one of the teeth 8b and 9b which is viewed from an axial direction of the first stator core 8 and the second stator core 9. Particularly, by narrowing the size Tc in the circumferential direction of each of the teeth 8b and 9b of the stator core 7 to make each of the teeth-shaped portions 11b of the magnet 11 protrude, the magnetic leakage flux between teeth 8b and that between teeth 9b can be reduced greatly, and the flux densities of the teeth 8b and 9b can be increased. Therefore, the power performance can be improved greatly without reducing the speed of response of the rotating electric motor 100, and this rotating electric motor is suitable for uses which require ultra-high-speed rotations.

Although the rotating electric motor 100 is constructed in a concentrated winding manner in above-mentioned Embodiment 1, the rotating electric motor can be constructed in a distributed winding manner. In this case, it is not necessary to mention especially that the same advantage is provided.

Further, in above-mentioned Embodiment 1, the inner diameter of the magnet 11 is made to be equal to that of the stator core 7 (i.e., the length in the radial direction of each of the teeth-shaped portions 11b of the magnet 11 is made to be equal to that of each of the teeth 8b and 9b of the stator core 7). As an alternative, the inner diameter of the magnet can be made to be different from that of the stator core. However, it is preferable that the inner diameter of the magnet 11 is made to be equal to that of the stator core 7 because the torque is improved.

In contrast, from the viewpoint of producing the rotating electric motor 100, it is preferable that the inner diameter of the magnet 11 is made to be larger than that of the stator core 7 and the magnet 11 is placed at a position closer to an outer circumference because a resultant vacant space on a side of the inner circumference can be sealed with a resin or the like.

Figure 8:
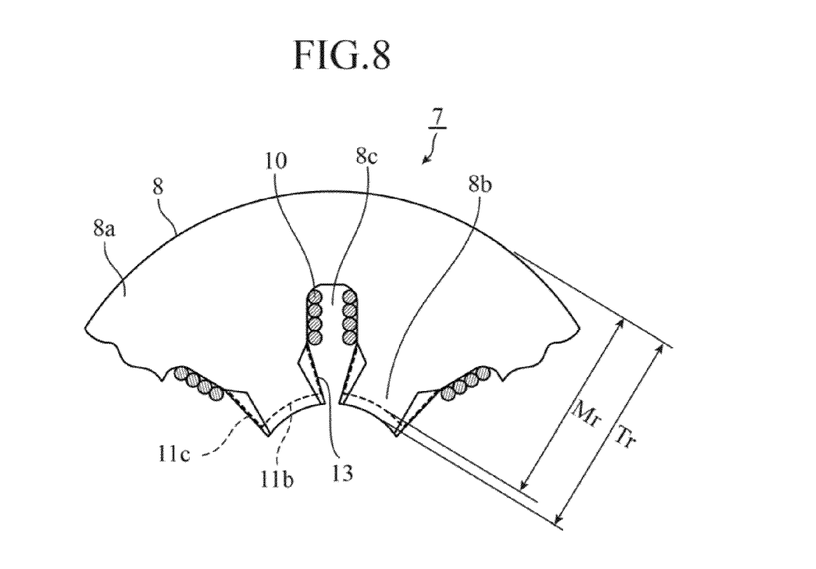
FIG. 8 is a plane view showing a variant of the rotating electric motor in accordance with Embodiment 1, and showing the stator which is viewed from the first stator core.

For example, in a plane view of the stator core 7 viewed from an axial direction, which is shown in FIG. 8, the length Mr in the radial direction of each of the teeth-shaped portions 11b of the magnet 11 is made to be shorter than that Tr of each of the teeth 8b and 9b, and resultant vacant spaces are sealed with a resin to form resin sealed portions 13 and, as a result, the teeth-shaped portions 11b and the protruding portions 11c are covered. By forming the resin sealed portions 13, even if a crack or a chip occurs in the magnet 11, a fragment of the magnet 11 can be prevented from entering a region on a side of the inner circumference where the rotor 2 is rotating, thereby being able to prevent a failure of locking the rotor 2 (making the rotor not move). Further, in a case in which a magnet in which an eddy current flows through a surface thereof because of a change of the magnetic flux, such as a neodymium magnet, is used as the magnet 11, an advantage of reducing the eddy current loss can also be provided by locating the position of the magnet away from the rotor 2 as shown in FIG. 8. The rotating electric motor 100 can be made to have a high degree of efficiency by reducing the eddy current.

Further, in above-mentioned Embodiment 1, the size in the circumferential direction of each of the teeth 8b and 9b of the stator core 7 is made to be smaller to form the protruding portions 11c without changing the size in the circumferential direction of each of the teeth-shaped portions 11b of the magnet 11. In contrast with this, the size in the circumferential direction of each of the teeth-shaped portions 11b of the magnet 11 can be made to be larger to form the protruding portions 11c without changing the size in the circumferential direction of each of the teeth 8b and 9b of the stator core 7.

Figure 9:
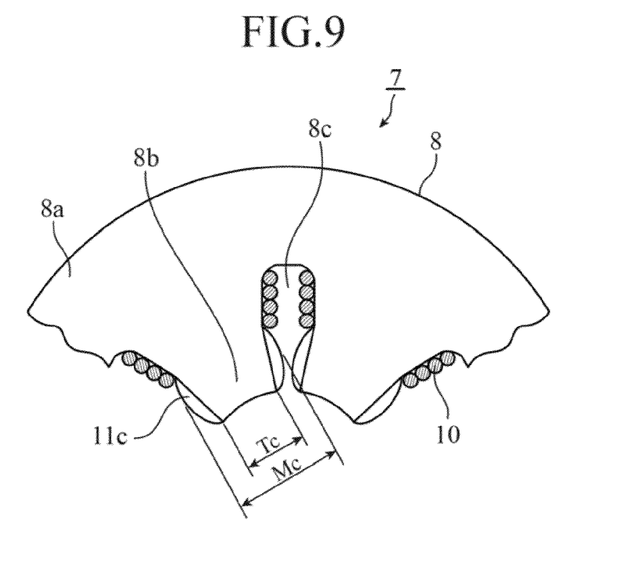
FIG. 9 is a plane view showing another variant of the rotating electric motor in accordance with Embodiment 1, and showing the stator which is viewed from the first stator core.

For example, in a plane view of the stator core 7 viewed from an axial direction, which is shown in FIG. 9, the size Mc in the circumferential direction of each of the teeth-shaped portions 11b of the magnet 11 is set to be larger than that Tc of each of the teeth 8b and 9b to form the protruding portions 11c. The size Tc in the circumferential direction of each of the teeth 8b and 9b in the conventional shape (without the protruding portions 11c) shown in FIG. 5 is made to be the same as that in the shape shown in this FIG. 9, and, in FIG. 9, the size Mc in the circumferential direction of the leading end part of each of the teeth-shaped portions 11b of the magnet 11 is made to be larger to form the protruding portions 11c. In this case, although the magnetic leakage flux is not reduced because the shape of each of the teeth 8b and 9b is not changed, the flux densities of the teeth 8b and 9b are increased and hence the torque is improved because the magnet 11 is increased in size. Therefore, in a case in which the same power as that in the case of the conventional shape of FIG. 5 (without the protruding portions 11c) and torque are needed, the shape shown in FIG. 9 is effective.

Embodiment 2

Figure 10:
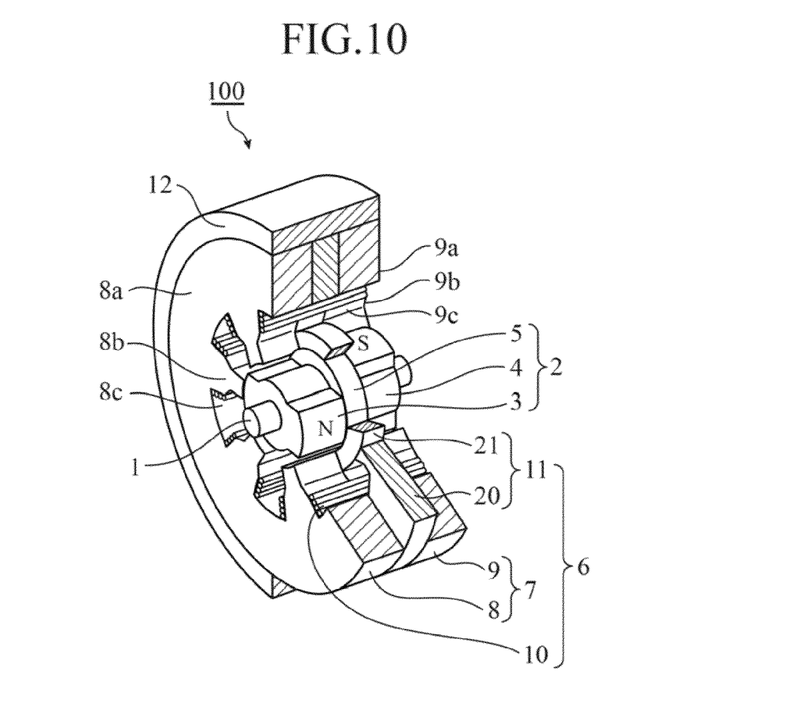
FIG. 10 is a partially broken perspective view showing the structure of a rotating electric motor in accordance with Embodiment 2 of the present invention.

FIG. 10 is a partially broken perspective view showing the structure of a rotating electric motor 100 in accordance with Embodiment 2 of the present invention. In FIG. 10, the same components as those shown in FIG. 1 or like components are designated by the same reference numerals, and the explanation of the components will be omitted hereafter. In accordance with above-mentioned Embodiment 1, the size in the circumferential direction of each of the teeth-shaped portions 11b is set to be larger than that of each of the teeth 8b and 9b so as to form the protruding portions 11c. In contrast, in accordance with this Embodiment 2, an inner ring-shaped magnet 21 for filling in slots 8c and 9c, which is located inwardly in a radial direction with respect to a stator coil 10 on teeth 8b and 9b, is disposed so as to form protruding portions 11c.

Figure 11:
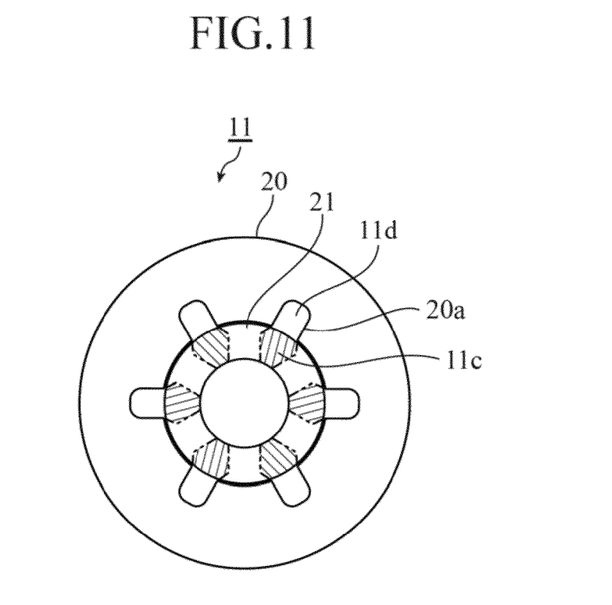
FIG. 11 is a plane view showing a variant of the rotating electric motor in accordance with Embodiment 2, and showing the shape of a magnet.

FIG. 11 is a plane view showing an example of the shape of a magnet 11 in accordance with this Embodiment 2.

Concretely, the magnet 11 consists of the following two pieces: an outer ring-shaped magnet 20 having a large diameter, and the inner ring-shaped magnet 21 having a small diameter which is inscribed in this outer ring-shaped magnet 20. The outer ring-shaped magnet 20 is formed in such a way as to have substantially the same shape as bases of core backs 8a and 9a and the teeth 8b and 9b. Further, recessed portions 20a are disposed at portions where the stator coil 10 penetrates so as to construct slot-shaped portions 11d. The inner ring-shaped magnet 21 is disposed on a side of an inner circumference of the outer ring-shaped magnet 20 in such a way as to enclose an outer circumference of a partition 5 disposed between a first magnetic body 3 and a second magnetic body 4 of a rotor 2.

In a case in which the magnet 11 which consists of the outer ring-shaped magnet 20 and the inner ring-shaped magnet 21 is sandwiched coaxially between a first stator core 8 and a second stator core 9, parts of the inner ring-shaped magnet 21 form the protruding portions 11c protruding with respect to the teeth 8b and 9b (portions in FIG. 11 each of which is shown by a hatched area).

Because the magnet 11 has the two pieces in the structure shown in FIG. 11, there remains a problem that an operation of attaching the outer ring-shaped magnet 20 and the inner ring-shaped magnet 21 which are different bodies at the time of producing the rotating electric motor 100 takes a certain amount of time because the magnet consists of the two parts. However, by applying a bonding adhesive to a contact surface between the outer ring-shaped magnet 20 and the inner ring-shaped magnet 21 to make them become integrated into a single piece at that time, the above-mentioned problem can be solved.

Figure 12:
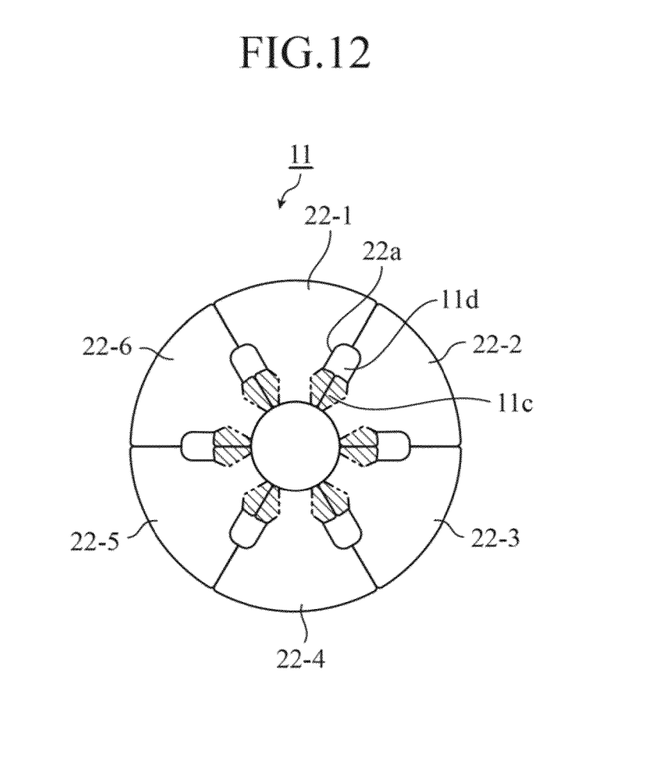
FIG. 12 is a plane view showing another variant of the rotating electric motor in accordance with Embodiment 2, and showing the shape of a magnet.

FIG. 12 is a plane view showing another example of the shape of the magnet 11 in accordance with this Embodiment 2.

Concretely, in order to form the magnet 11 which consists of the outer ring-shaped magnet 20 and the inner ring-shaped magnet 21 in one piece, the magnet is divided into six piece magnets 22-1 to 22-6. The piece magnets 22-1 to 22-6 are shaped like a fan, and their lengths in a radial direction are substantially the same as the length in the radial direction of a portion extending from the outer ring-shaped magnet 20 to the inner ring-shaped magnet 21. Recessed portions 22a are disposed in portions of each of the piece magnets 22-1 to 22-6 where the stator coil 10 penetrates so as to construct slot-shaped portions 11d.

In a case in which the magnet 11 in which the piece magnets 22-1 to 22-6 are combined into a doughnut shape is sandwiched coaxially between the first stator core 8 and the second stator core 9, an inner circumferential portion of each of the piece magnets 22-1 to 22-6 is made to have substantially the same shape as the inner ring-shaped magnet 21 shown in FIG. 11, and, as a result, protruding portions 11c protruding with respect to the teeth 8b and 9b (portions in FIG. 12 each of which is shown by a hatched area) are formed.

In the case of the structure shown in FIG. 12, by also dividing each of the first stator core 8 and the second stator core 9 into six pieces like the piece magnets 22-1 to 22-6, the space factor of the stator coil 10 (the ratio of the stator coil 10 to the slots 8c and 9c) can be raised. When the space factor of the stator coil 10 is raised, either an improvement in the torque because of an increase in the current which can be passed or a reduction of the copper loss can be provided, and an improvement in the efficiency of the stator coil 10 can be provided.

As a producing method used at this time, first, the six first stator core pieces into which the first stator core 8 is divided, the six second stator core pieces into which the second stator core 9 is divided, and the six piece magnets 22-1 to 22-6 into which the magnet 11 is divided are fixed to one another by using bonding or the like, respectively, so as to produce six stator core blocks. By winding the stator coil 10 around each stator core block, the winding can be facilitated even when using a thick, hard winding wire for conducting a large current as the stator coil 10, and the space factor of the stator coil 10 can be improved. Six pieces which are the same as this piece are produced and finally attached to a frame 12, so that each of the stator core blocks can be placed in a doughnut shape along an inner surface of the frame 12.

Further, in a case in which the rotating electric motor 100 is a one used for high-speed rotations in which the gap (air gap) between the rotor 2 and a stator 6 is significant, the six stator core blocks are formed in one piece having a doughnut shape by using a resin or the like in a state in which the inner surfaces of the six stator core blocks are flush with one another so as to produce the stator 6. At this time, because the outer surface of the stator 6 may become irregular due to variations in the sizes of the parts, etc., by using a frame 12 which can be deformed outwardly, the stator 6 is attached to the frame 12. As a result, the rotating electric motor 100 in which it can be ensured that the inner surface of the stator 6 has a certain circularity can be produced. Further, the piece magnets 22-1 to 22-6 can be formed in one piece without using a bonding adhesive or the like.

Because the slot-shaped portions 11d which make the stator coil 10 penetrate therethrough are formed in the magnet 11 having the shape shown in any of FIGS. 11 and 12, like in the case of above-mentioned Embodiment 1, the stator coil 10 can be wound around the teeth 8b and 9b, thereby being able to generate an alternating magnetic field. Further, the volume of the magnet 11 is increased as compared with that in accordance with above-mentioned Embodiment 1, and therefore the flux densities of the teeth 8b and 9b can be increased. Therefore, the average torque required to drive the rotating shaft 1 can be further increased, and the speed of response of the rotating electric motor 100 can be improved.

By narrowing the gap between the first stator core 8 and the magnet 11, and the gap between the second stator core 9 and the magnet 11 as much as possible, a torque reduction can be prevented. Further, because the torque is improved with increase in the volume of the magnet 11, it is desirable to narrow the gaps between the piece magnets 22-1 to 22-6 as much as possible in the case of FIG. 12, thereby increasing the volume.

As mentioned above, in the rotating electric motor 100 in accordance with Embodiment 2, the inner ring-shaped magnet 21 that encloses the rotating shaft 1 is disposed and a protruding portion 11c on a side of the leading end of each of the teeth-shaped portions 11b is extended in the circumferential direction in such away that parts of the plane of projection of each of the teeth-shaped portions 11b of the magnet 11 protrude in the circumferential direction with respect to the plane of projection of one of the teeth 8b and 9b which is viewed from the axial direction of the first stator core 8 and the second stator core 9. Therefore, the average torque required to drive the rotating shaft 1 can be increased, and the speed of response of the rotating electric motor 100 can be improved. Therefore, a rotating electric motor 100 suitable for uses which require ultra-high-speed rotations can be provided.

Although the structure of combining the two piece magnets (the outer ring-shaped magnet 20 and the inner ring-shaped magnet 21) and the structure of combining the six piece magnets (piece magnets 22-1 to 22-6) are illustrated in above-mentioned Embodiment 2, this embodiment is not limited to these structures. For example, a single piece magnet 1 having a doughnut shape in which six slot-shaped portions are open can be used instead of the piece magnets.

Embodiment 3

Figure 13:
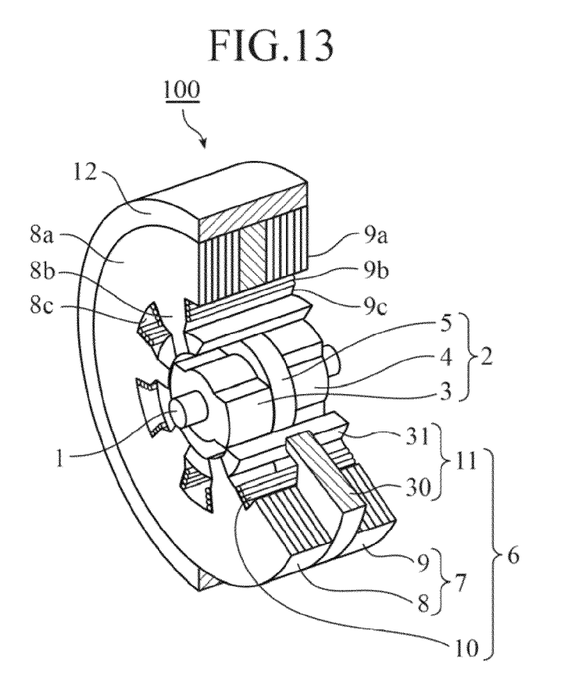
FIG. 13 is a partially broken perspective view showing the structure of a rotating electric motor in accordance with Embodiment 3 of the present invention.

FIG. 13 is a partially broken perspective view showing the structure of a rotating electric motor 100 in accordance with Embodiment 3 of the present invention. In FIG. 13, the same components as those shown in FIG. 1 or like components are designated by the same reference numerals, and the explanation of the components will be omitted hereafter. In accordance with above-mentioned Embodiment 1, the size in the circumferential direction of each of the teeth-shaped portions 11b is set to be larger than that of each of the teeth 8b and 9b so as to form the protruding portions 11c. In contrast, in accordance with this Embodiment 3, pillar-shaped magnets 31 for filling in slots 8c and 9c, which are located inwardly in a radial direction with respect to a stator coil 10 on teeth 8b and 9b, are disposed so as to form protruding portions 11c.

Figure 14:
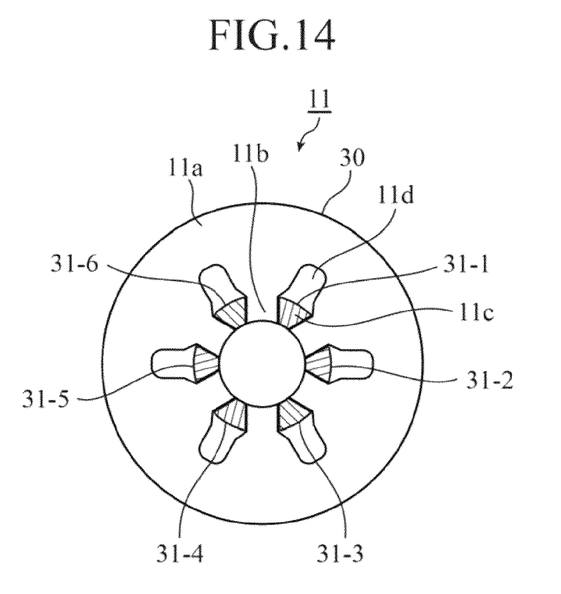
FIG. 14 is a plane view showing the shape of a magnet of the rotating electric motor in accordance with Embodiment 3.

FIG. 14 is a plane view showing an example of the shape of a magnet 11 in accordance with this Embodiment 3.

Concretely, the magnet 11 consists of a magnet 30 of substantially the same shape as a first stator core 8 and a second stator core 9, and the pillar-shaped magnets 31 with which to fill in openings, on a side of an inner circumference, of slot-shaped portions 11d formed in this magnet 30. Because the rotating electric motor 100 is a 4-pole 6-slot one, the six pillar-shaped magnets 31 (pillar-shaped magnet 31-1 to 31-6 of FIG. 14) are inserted into the six slot-shaped portions 11d in an axial direction, respectively, in such a way as to enclose an outer circumference of a partition 5 disposed between a first magnetic body 3 and a second magnetic body 4 of a rotor 2.

These pillar-shaped magnets 31-1 to 31-6 form the protruding portions 11c protruding with respect to the teeth 8b and 9b of the first stator core 8 and the second stator core 9 (portions in FIG. 14 each of which is shown by a hatched area).

In the case of the structure shown in FIG. 14, after the magnet 30 is sandwiched between the first stator core 8 and the second stator core 9 and they are integrated into a single piece by using bonding or the like, the stator coil 10 is wound, and, after that, the pillar-shaped magnets 31-1 to 31-6 are inserted into the slots 8c and 9c in the axial direction, respectively, and are bonded to the magnet 30, the first stator core 8, and the second stator core 9.

The shape of the pillar-shaped magnets 31-1 to 31-6 can be deformed according to the shape of the slots 8c and 9c, and the shape is not limited to the example shown in FIG. 14. Because the pillar-shaped magnets 31-1 to 31-6 are formed into a tapered shape, and the size in a circumferential direction of an outer circumference of each of the pillar-shaped magnets is set to be smaller than the size in the circumferential direction of an opening, on a side of the inner circumference, of each of the slots 8c and 9c in the example shown in FIG. 14, the pillar-shaped magnets can be prevented from slipping off in a direction of the inner circumference. Even in a case in which the size in the circumferential direction of each of the pillar-shaped magnets 31-1 to 31-6 is set to be smaller than the size in the circumferential direction of the opening, on a side of the inner circumference, of each of the slots 8c and 9c in such a way that the pillar-shaped magnets can slip off in a direction of the inner circumference, by bonding the pillar-shaped magnets 31-1 to 31-6 to the stator 6, it becomes difficult for the pillar-shaped magnets 31-1 to 31-6 to move because of the bonding with the stator 6 and the action of the magnetic force acting between the magnets and the stator 6.

Hereafter, a comparison among the structures shown in Embodiments 1 to 3 will be made.

Figure 15:
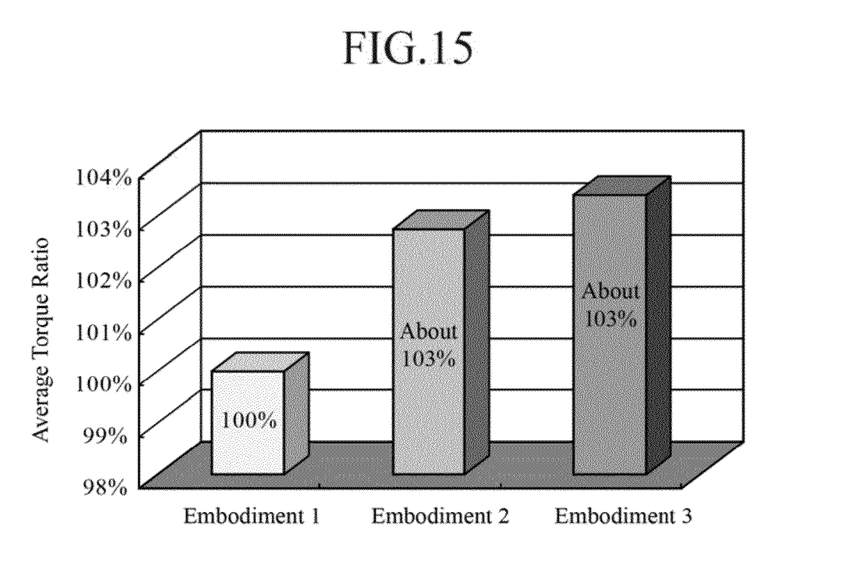
FIG. 15 is a graph showing the results of a comparison among trial calculations of an average torque for the rotating electric motors in accordance with Embodiments 1 to 3.

FIG. 15 is a graph showing the results of making trial calculations of the average torque for the structures shown in Embodiments 1 to 3 and making a comparison among the results. In the figure, the horizontal axis shows Embodiments 1 to 3, and the vertical axis shows a torque ratio in the case of Embodiments 2 and 3 when it is assumed that the average torque in the case of Embodiment 1 is 100%.

As shown in FIG. 15, it is seen that the average torque for driving the rotor 2 can be improved by about 3% or so because the flux densities of the teeth 8b and 9b are increased by forming the magnet 11 into a shape for filling in the slots 8c and 9c, like in the case of Embodiments 2 and 3.

As mentioned above, in the rotating electric motor 100 in accordance with Embodiment 3, the pillar-shaped magnets 31-1 to 31-6 having a shape extending in the axial direction up to the slots 8c and 9c of the first stator core 8 and the second stator core 9 are disposed and a protruding portion 11c on a side of the leading end of each of the teeth-shaped portions 11b is extended in the circumferential direction in such a way that parts of the plane of projection of each of the teeth-shaped portions 11b of the magnet 11 protrude in the circumferential direction with respect to the plane of projection of one of the teeth 8b and 9b which is viewed from the axial direction of the first stator core 8 and the second stator core 9. Therefore, the average torque required to drive the rotating shaft 1 can be increased, and the speed of response of the rotating electric motor 100 can be improved. Therefore, a rotating electric motor 100 suitable for uses which require ultra-high-speed rotations can be provided.

In the illustrated example, each of the pillar-shaped magnets 31-1 to 31-6 has a shape extending in the axial direction up to the slots 8c and 9c of the first stator core 8 and the second stator core 9. As an alternative, each of the pillar-shaped magnets can have a shape extending in the axial direction up to either one of the slots 8c and 9c.

Embodiment 4

Figure 16:
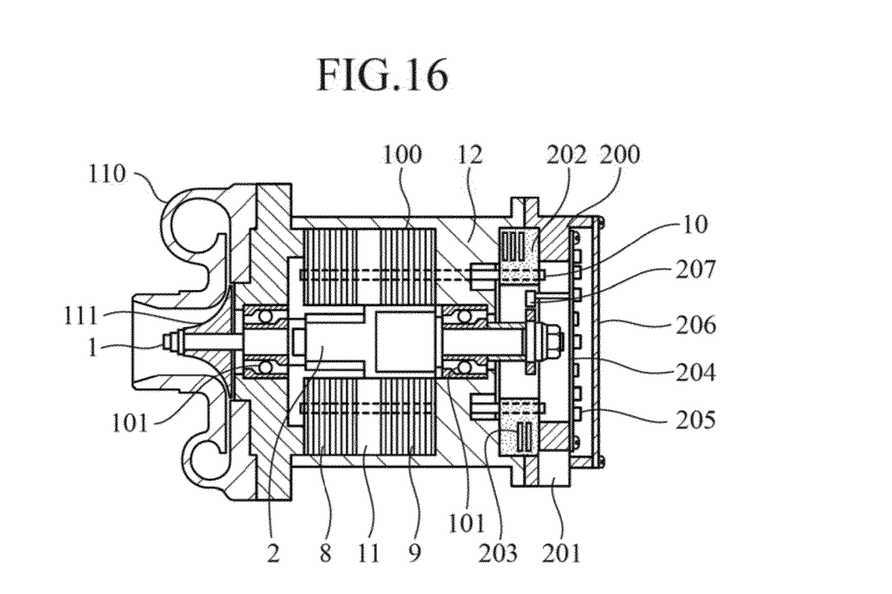
FIG. 16 is a cross-sectional view showing the structure of an internal combustion engine supercharger in accordance with Embodiment 4 of the present invention, and showing the structure of using the rotating electric motor in accordance with any one of Embodiments 1 to 3.

FIG. 16 is a cross-sectional view for explaining a concrete structure in a case of using the rotating electric motor 100 in accordance with any one of Embodiments 1 to 3 in an internal combustion engine supercharger for cars etc. Hereafter, an explanation will be made by using FIGS. 1, 10, and 13.

The both ends of the rotor 2 are rotatably supported by two bearings 101, and the first stator core 8 and the second stator core 9 that sandwich the magnet 11 therebetween are enclosed in the frame 12. Further, a rotary wing 111 is mounted to one end of the rotating shaft 1, and the rotary wing 111 is rotatably enclosed in a compressor housing 110.

On a side of the rotating electric motor 100 which is opposite to the compressor housing 110, a controller 200 for controlling the rotation of the rotary wing 111 is mounted integrally by using not shown screws. Further, a rotation detection sensor 207 is placed in an area surrounding the end portion of the rotating shaft 1 on the same side as the controller 200.

The controller 200 covered by a cover 206 includes a board ASSY 204 on which electronic parts 205 necessary in order to control the rotation of the rotary wing 111 are mounted, and performs a switching control operation of switching electric power supplied from a power connector 201 among the phases of the stator coil 10 by way of a bus bar 203 which is molded integrally in a bus bar ASSY 202.

In the internal combustion engine supercharger constructed this way, the width in the circumferential direction of each of the teeth-shaped portions 11b of the magnet 11 is set to be larger than that of each of the teeth 8b and 9b of the first stator core 8 and the second stator core 9, as shown in Embodiments 1 to 3.

As a result, because the flux density flowing from the salient pole 3b of the rotor 2 to the teeth 8b of the first stator core 8 and the flux density flowing from the teeth 9b of the second stator core 9 to the salient pole 4b of the rotor 2, as shown by the arrow in FIG. 1, are increased, the driving torque of the rotating shaft 1 is improved.

Therefore, in the case in which the rotating electric motor 100 which is constructed by using the magnet 11 as mentioned above is used for the internal combustion engine supercharger, the time required to reach a target number of rotations can be shortened greatly.

As mentioned above, because the internal combustion engine supercharger for cars etc. in accordance with Embodiment 4 is constructed in such a way as to rotationally drive the rotary wing 111 of the compressor by using the rotating electric motor 100 in accordance with any one of above-mentioned Embodiments 1 to 3, the driving torque of the rotary wing 111 can be increased. Therefore, because the supercharge capability of the supercharger can be increased and the responsivity of the supercharge function can also be improved greatly, an internal combustion engine supercharger having high responsivity according to the driver's acceleration operation can be provided.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

As mentioned above, because the rotating electric motor in accordance with the present invention is constructed in such a way that the width in the circumferential direction of each of the teeth-shaped portions 11b of the magnet 11 is set to be larger than that of each of the teeth 8b and 9b of the stator core 7, and the rotating electric motor is suitable for ultra-high-speed rotations, the rotating electric motor is suitable for use in an internal combustion engine supercharger which is mounted in a car or the like, and so on.

EXPLANATIONS OF REFERENCE NUMERALS 1 rotating shaft, 2 rotor, 3 first magnetic body, 3a base, 3b salient pole, 4 second magnetic body, 4a base, 4b salient pole, 5 partition, 6 stator, 7 stator core, 8 first stator core, 8a and 9a core back, 8b and 9b teeth, 8c and 9c slot, 9 second stator core, 10 stator coil (drive coil for torque generation), 11 magnet (magnet for field magnetomotive force generation), 11a core-back-shaped portion, 11b teeth-shaped portion, 11c protruding portion, 11d slot-shaped portion, 12 frame, 13 resin sealed portion, 20 outer ring-shaped magnet, 20a and 22a recessed portion, 21 inner ring-shaped magnet, 22-1 to 22-6 piece magnet, 100 rotating electric motor, 101 bearing, 110 compressor housing, 111 rotary wing, 200 controller, 201 power connector, 202 bus bar ASSY, 203 bus bar, 204 board ASSY, 205 electronic part, 206 cover, 207 rotation detection sensor.

The invention claimed is:

1. A rotating electric motor comprising:
   a frame;
   a rotor that is fixed to a rotating shaft rotatably supported by said frame, and that is rotatably disposed within said frame; and
   a stator including two stator cores of the same shape that are held by said frame and that are coaxially disposed in such a way as to enclose said rotor, a magnet for field magnetomotive force generation that is sandwiched between said two stator cores and that excites said rotor, and a drive coil for torque generation that is wound around said two stator cores and that causes said rotor to generate a rotary torque, wherein
   each of said stator cores has a disk-shaped core back and teeth protruding inwardly in a radial direction from an inner surface of said core back and constructing slots that are open toward an inner circumference thereof, said magnet for field magnetomotive force generation has a core-back-shaped portion of the same shape as said core backs of said stator cores and teeth-shaped portions of the same shape as said teeth, and a part of a plane of projection of each of said teeth-shaped portions of said magnet for field magnetomotive force generation protrudes in a circumferential direction with respect to that of one of said teeth which is viewed from an axial direction of said stator cores.

2. The rotating electric motor according to claim 1, wherein a width in a circumferential direction of each of said teeth-shaped portions of said magnet for field magnetomotive force generation is set to be larger than that of each of said teeth of said stator cores.

3. The rotating electric motor according to claim 2, wherein the part of said magnet for field magnetomotive force generation protruding with respect to said teeth is extended in the circumferential direction, and is formed in a ring shape enclosing said rotor.

4. The rotating electric motor according to claim 2, wherein the part of said magnet for field magnetomotive force generation protruding with respect to said teeth is extended in an axial direction up to said slots of each of said two stator cores.

5. An internal combustion engine supercharger that rotationally drives a rotary wing of a compressor by using the rotating electric motor according to claim 1.

* * * * *